US007852806B2

(12) United States Patent
Ahn et al.

(10) Patent No.: US 7,852,806 B2
(45) Date of Patent: Dec. 14, 2010

(54) METHOD FOR ACQUIRING RESOURCE REGION INFORMATION FOR PHICH AND METHOD OF RECEIVING PDCCH

(75) Inventors: Joon Kui Ahn, Seoul (KR); Bong Hoe Kim, Seoul (KR); Young Woo Yun, Gyeonggi-do (KR); Ki Jun Kim, Seoul (KR); Jung Hoon Lee, Seoul (KR); Dae Won Lee, Seoul (KR); Dong Youn Seo, Seoul (KR); Dong Wook Roh, Seoul (KR); Suk Hyon Yoon, Seoul (KR)

(73) Assignee: LG Electronics, Inc., Seoul (KR)

( * ) Notice: Subject to any disclaimer, the term of this patent is extended or adjusted under 35 U.S.C. 154(b) by 0 days.

(21) Appl. No.: 12/558,460

(22) Filed: Sep. 11, 2009

(65) Prior Publication Data

US 2010/0002647 A1  Jan. 7, 2010

Related U.S. Application Data

(63) Continuation of application No. 12/526,499, filed as application No. PCT/KR2008/004754 on Aug. 14, 2008.

(60) Provisional application No. 60/955,863, filed on Aug. 14, 2007.

(30) Foreign Application Priority Data

Aug. 14, 2008  (KR) .................. 10-2008-0079740

(51) Int. Cl.
*H04L 27/28* (2006.01)
(52) U.S. Cl. ..................................... 370/329; 370/344

(58) Field of Classification Search ................. 370/329
See application file for complete search history.

(56) References Cited

U.S. PATENT DOCUMENTS

2005/0157680 A1   7/2005  Zhang et al.

(Continued)

FOREIGN PATENT DOCUMENTS

EP           1175022         1/2002

(Continued)

OTHER PUBLICATIONS

EPO Office Action for PCT/KR2008/004754 (8 pages) dated Jun. 29, 2010.*

(Continued)

*Primary Examiner*—Lester Kincaid
*Assistant Examiner*—Steven Kelley
(74) *Attorney, Agent, or Firm*—Lee, Hong, Degerman, Kang & Waimey

(57) ABSTRACT

A method of acquiring information on a resource region for transmitting PHICH and a method of receiving PDCCH using the same are disclosed. The resource region for transmitting the PHICH can be specified by first information corresponding to the per-subframe PHICH number and second information corresponding to a duration of the PHICH within the subframe. The first information can be specified into a form resulting from multiplying a predetermined basic number by a specific constant. And, the specific constant can be transmitted via PBCH. Moreover, the second information can be acquired from the PBCH as well.

9 Claims, 6 Drawing Sheets

U.S. PATENT DOCUMENTS

| | | | |
|---|---|---|---|
| 2006/0023745 A1 | 2/2006 | Koo et al. | |
| 2006/0034240 A1 | 2/2006 | Kwak et al. | |
| 2006/0128410 A1 | 6/2006 | Derryberry et al. | |
| 2007/0011550 A1 | 1/2007 | Agrawal et al. | |
| 2007/0140178 A1 | 6/2007 | Jung et al. | |
| 2009/0046672 A1* | 2/2009 | Malladi et al. | 370/336 |
| 2009/0046789 A1* | 2/2009 | Xu et al. | 375/260 |
| 2009/0055703 A1* | 2/2009 | Kim et al. | 714/748 |
| 2009/0097447 A1* | 4/2009 | Han et al. | 370/330 |
| 2009/0109906 A1* | 4/2009 | Love et al. | 370/329 |
| 2009/0168922 A1* | 7/2009 | Malladi et al. | 375/316 |
| 2009/0175233 A1* | 7/2009 | Ojala et al. | 370/329 |
| 2009/0196240 A1* | 8/2009 | Frederiksen et al. | 370/329 |
| 2009/0201863 A1* | 8/2009 | Pi | 370/329 |
| 2009/0201904 A1* | 8/2009 | Lee et al. | 370/342 |
| 2009/0238131 A1* | 9/2009 | Montojo et al. | 370/329 |
| 2009/0245187 A1* | 10/2009 | Nam et al. | 370/329 |
| 2009/0259909 A1* | 10/2009 | Luo | 714/748 |
| 2009/0274037 A1* | 11/2009 | Lee et al. | 370/208 |
| 2009/0290597 A1* | 11/2009 | Baumgartner et al. | 370/468 |

FOREIGN PATENT DOCUMENTS

| | | |
|---|---|---|
| EP | 1349292 | 10/2003 |
| EP | 1389848 A1 | 2/2004 |
| EP | 1784036 A1 | 5/2007 |
| EP | 1819088 | 8/2007 |
| KR | 1020020009079 | 2/2002 |
| KR | 1020060092055 | 8/2006 |
| WO | 0176110 | 10/2001 |
| WO | 2004-051872 | 6/2004 |
| WO | 2004049613 | 6/2004 |
| WO | 2005-074312 | 8/2005 |
| WO | 2005114888 | 12/2005 |
| WO | 2005117319 | 12/2005 |
| WO | 2006138337 | 12/2006 |
| WO | 2007/066936 | 6/2007 |

OTHER PUBLICATIONS

Nokia, "Data-non-associated Control Signal Transmission with UL Data," 3GPP TSG RAN WG1 Meeting #48, R1-071000, Feb. 2007, XP-002573203.

3rd Generation Partnership Project (3GPP), "Technical Specification Group Radio Access Network; LTE Physical Layer—General Description (Release 8)," 3GPP TS 36.201 v0.11, R1-071252, Mar. 2007, XP-050105207.

LTE Rapporteur (NTT DoCoMo), "Text Proposal for TS 36.300 (Stage 2 TS)," 3GPP TSG RAN WG1 Meeting #48, R1-071251, Feb. 2007, XP-050105206.

Lee, H., et al., "Novel Multi-User MIMO Scheme Based on Successive Interference Cancellation," IEEE International Symposium on Consumer Electronics, Jun. 20, 2007, XP031160370.

LG Electronics, "Allocation of UL ACK/NACK Index," 3GPP TSG RAN WG1#49, R1-072348, May 7, 2007, XP050106077.

LG Electronics, "PHICH Duration and Signaling," 3GPP TSG RAN WG1#50, R1-073476, Aug. 20, 2007, XP050107084.

Ericsson, "E-mail Summary Taking you Forward on Downlink Control Signaling," 3GPP TSG RAN WG1#50bis, R1-074369, Oct. 8, 2007, XP050107884.

Motorola, "PHICH Resource Signaling for TDD & FDD," 3GPP TSG RAN #51bis, R1-080433, Jan. 14, 2007, XP050108952.

Motorola, "PHICH Resource Signaling for TDD & FDD," 3GPP TSG RAN #52bis, R1-081286, Apr. 1, 2008, XP050109724.

Catt, et al., "Indication of PHICH Resource for TDD," 3GPP TSG RAN #52bis, R1-081326, Mar. 31, 2008, XP050109752.

Panasonic, "CQI Feedback Control and Content in E-UTRA", 3GPP RAN WG1, R1-072077, May 2, 2007, XP050105831.

* cited by examiner

METHOD FOR ACQUIRING RESOURCE REGION INFORMATION FOR PHICH AND METHOD OF RECEIVING PDCCH

CROSS-REFERENCE TO RELATED APPLICATIONS

This application is a continuation of U.S. application Ser. No. 12/526,499, filed Aug. 7, 2009, currently pending, which is the National Stage filing under 35 U.S.C. 371 of International Application No. PCT/KR2008/004754, filed on Aug. 14, 2008, which claims the priority of Korean Patent Application No. 10-2008-0079740, filed on Aug. 14, 2008 and Provisional Application No. 60/955,863 filed on Aug. 14, 2007, the contents of which are hereby incorporated by reference herein in their entirety.

TECHNICAL FIELD

The present invention relates to a method of acquiring location information of a resource region for transmitting a physical hybrid HARQ indicator channel (PHICH) in a mobile communication system and a method of receiving a physical downlink control channel (PDCCH) using the same.

BACKGROUND ART

In transmitting a packet in a mobile communication system, a receiver should inform a transmitter of a presence or non-presence of success of a packet reception. In case that the packet reception is successful, ACK is transmitted to enable the transmitter to transmit a new packet. In case that packet reception fails, NACK is transmitted to enable the transmitter to retransmit the corresponding packet. This operation is called ARQ (automatic request).

The ARQ operation can be combined with channel coding scheme. In particular, the above-mentioned ARQ is proposed as HARQ (hybrid ARQ) which raises efficiency of whole system in a manner of lowering an error rate by combining a retransmitted packet with a previously transmitted packet. In order to raise throughput of system, the HARQ is requested to receive an ACK/NACK response faster than that of the conventional ARQ operation from a receiver. Hence, ACK/NACK is transmitted by physical channel signaling in HARQ.

Implementations of HARQ can be categorized into two types. A first type is chase combining (CC), in which retransmission is performed using the same code bits by the same modulation scheme and coding rate as that of a previously packet. A second type is incremental redundancy (IP), in which retransmission is performed in a manner of allowing a transmission by using a modulation scheme and coding rate different from those of the previously transmitted packet. In this case, the receiver can raise the throughput of system through coding diversity.

In a multi-carrier cellular module communication system, user equipments belonging to one or a plurality of cells perform uplink data packet transmission to a base station. Since a plurality of user equipments are able to transmit uplink data packets within a single subframe, a base station should be able to transmit ACK/NACK signals to a plurality of the user equipments within the single subframe. In particular, in the 3GPP LTE system, a base station transmits ACK/NACK signals to a plurality of user equipments via a physical HARQ indicator channel (hereinafter abbreviated PHICH), and more particularly, via a channel for transmitting downlink ACK/NACK information for uplink HARQ.

In case that a base station multiplexes a plurality of ACK/NACK signals transmitted to user equipments within a single subframe by CDMA in a partial time-frequency domain of a downlink transmission band of a multi-carrier system, the multiplexed signals are discriminated from ACK/NACK signals for other user equipments by orthogonal or pseudo-orthogonal code multiplied through the time-frequency domain. Moreover, in case of performing QPSK transmission, the discrimination can be achieved through two different orthogonal phase components. In particular, a plurality of ACK/NACK signals are transmitted by being multiplexed by CDMA through a plurality of PHICHs in the 3GPP LTE system. And, a unit of the transmission through the multiplexing by CDMA is called 'PHICH group'.

Meanwhile, in case that a specific user equipment tries an initial access to a prescribed cell, the user equipment needs to acquire system information of the corresponding cell. Such basic information e.g. system bandwidth can be received via a physical broadcast channel (hereinafter abbreviated 'PBCH'). Yet, in order to acquire detailed system information from the system information of the corresponding cell, the user equipment is requested to receive a physical downlink shared channel (hereinafter abbreviated 'PDSCH') that is the channel for transmitting general downlink data.

In this case, scheduling information of PDSCH is transmitted via PDCCH of each subframe. A user equipment in progress of an initial access receives PBCH and then receives PDCCH of a specific subframe. Hence, the user equipment is able to know scheduling information on PDSCH transmitting detailed system information through that subframe. In this case, in order to receive the PDCCH having the scheduling information about the PDSCH transmitting the detailed system information, a transmission location of the corresponding PDCCH should be known.

Since PDCCH is generally mapped to RE (Resource Element) except RE(s) for carrying PHICH and other control signals, it should be checked how the PHICH and other control signals are mapped to a resource region to receive the PDCCH.

DISCLOSURE OF THE INVENTION

Technical Problem

Technical Solution

Accordingly, the present invention is directed to a method of acquiring resource region information for PHICH in a mobile communication system and a method of receiving a physical downlink control channel (PDCCH) using the same that substantially obviate one or more of the problems due to limitations and disadvantages of the related art.

An object of the present invention is to provide a method of acquiring resource region information for PHICH in a mobile communication system and a method of receiving a physical downlink control channel (PDCCH) using the same, by which location information of a resource region for transmitting PHICH is efficiently transferred and by which an initial access user equipment is facilitated to receive PDCCH.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of acquiring PHICH transmission resource region information, in which a user equipment (UE) acquires resource region information for transmitting PHICH (physical hybrid ARQ indicator channel), according to the present invention includes the steps of, receiving a PBCH (physical broadcast channel), and acquiring the resource region information for transmitting the PHICH according to information of the received PBCH, wherein the resource region for transmitting the PHICH is determined according to a first information corresponding to the number (N) of PHICH per subframe and a second information corresponding to a duration (m) of the PHICH per subframe, wherein the first information is determined as a value resulting from multiplying a basic number predetermined according to a system bandwidth by a specific constant, and wherein the specific constant is acquired from the information of the received PBCH.

To further achieve these and other advantages and in accordance with the purpose of the present invention, a method of receiving a PDCCH, in which a user equipment (UE) receives a physical downlink control channel (PDCCH), includes the steps of receiving a PBCH (physical broadcast channel), acquiring resource region information for transmitting a PHICH (physical hybrid ARQ indicator channel) according to information of the received PBCH, and receiving the PDCCH according to the resource region information for transmitting the PHICH, wherein the resource region for transmitting the PHICH is determined according to a first information corresponding to the number (N) of PHICH per subframe and a second information corresponding to a duration (m) of the PHICH per subframe, wherein the first information is determined as a value resulting from multiplying a basic number predetermined according to a system bandwidth by a specific constant, and wherein the specific constant is acquired from the information of the received PBCH.

Preferably, the first information includes either number information of the PHICH per subframe or number information of PHICH group per subframe. Preferably, the second information is acquired from the information of the received PBCH.

More preferably, the PBCH includes signaling information for indicating the duration (m) information of the PHICH per subframe. In this case, the signaling information can have a 1-bit length. More preferably, the specific constant includes one selected from the group consisting of ⅙, ½, 1 and 2.

Preferably, the PDCCH is received a resource region except the resource region for transmitting the PHICH within a prescribed OFDM symbol interval from a first OFDM symbol of each subframe and the PDCCH receiving step includes the step of enabling the user equipment to decode the resource region except the resource region for transmitting the PHICH within the prescribed OFDM symbol interval as a PDCCH search region.

To further achieve these and other advantages and in accordance with the purpose of the present invention, a method of transferring PHICH (physical hybrid ARQ indicator channel) transmission resource region information, includes the step of transmitting a PBCH (physical broadcast channel) including specific constant information, wherein the resource region for transmitting the PHICH is determined according to a first information corresponding to the number (N) of PHICH per subframe and a second information corresponding to a duration (m) of the PHICH per subframe and wherein the first information is determined as a value resulting from multiplying a basic number (e.g., a basic PHICH number or a basic PHICH group number) predetermined according to a system bandwidth by the specific constant.

Preferably, the first information includes either number information of the PHICH per subframe or number information of PHICH group per subframe. Preferably, the PBCH includes signaling information for indicating the second information.

It is to be understood that both the foregoing general description and the following detailed description are exemplary and explanatory and are intended to provide further explanation of the invention as claimed.

ADVANTAGEOUS EFFECTS

According to the above-described embodiments of the present invention, location information of a resource region for transmitting PHICH is efficiently transferred and an initial access user equipment is facilitated to receive PDCCH.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE

Mode for Invention

Reference will now be made in detail to the preferred embodiments of the present invention, examples of which are illustrated in the accompanying drawings.

Figure 1:
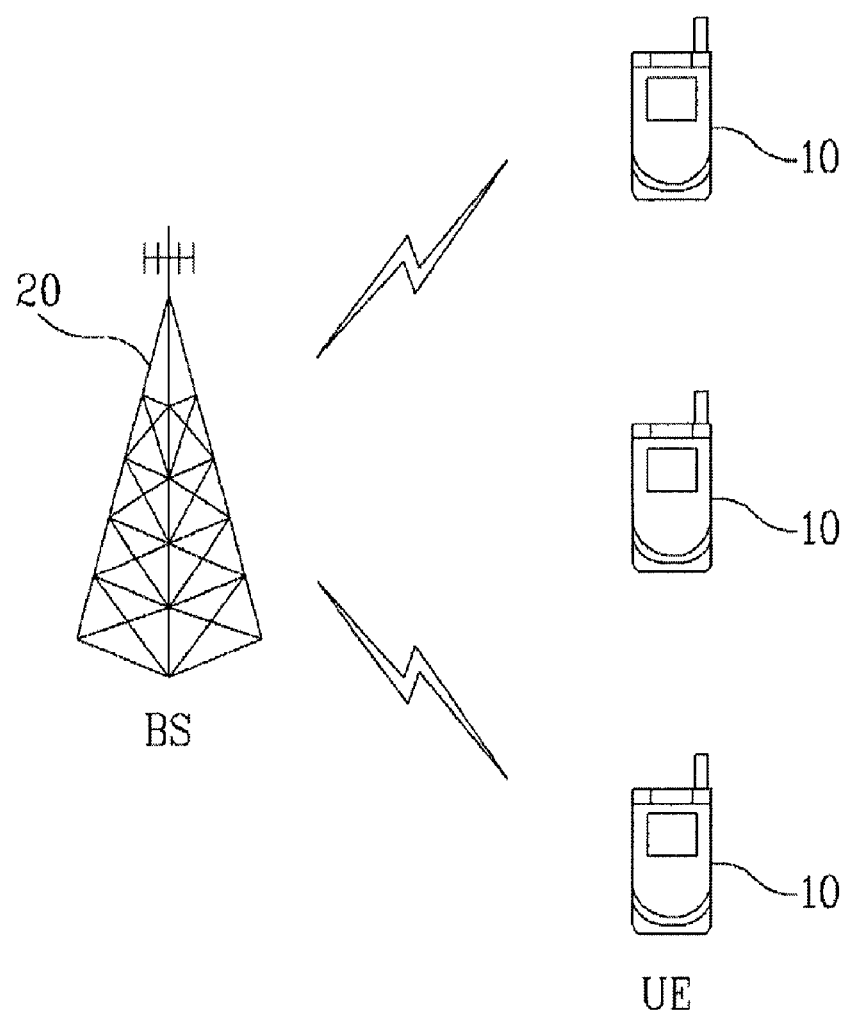
FIG. 1 is a block diagram of a wireless communication system.

FIG. 1 is a block diagram of a wireless communication system.

A wireless communication system is widely deployed to provide various communication services including voice, packet data and the like. Referring to FIG. 1, a wireless communication system includes a user equipment (UE) 10 and a base station (BS) 20. The user equipment 10 is fixed or can have mobility. And, a terminal can be called such a terminology as a user equipment (UE), a mobile station (MS), a user terminal (UT), a subscriber station (SS), a wireless device and the like. The base station 20 generally means a fixed station and can be called such a terminology as a node B (NodeB), a base transceiver system (BTS), an access point and the like. And, at least one cell can exist for a single base station 20.

The wireless communication system can be an OFDM/OFDMA (orthogonal frequency division multiplexing/orthogonal frequency division multiple access) based system. The OFDM uses a plurality of orthogonal subcarriers. The OFDM uses orthogonal characteristic between IFFT (inverse fast Fourier transform) and FFT (fast Fourier transform). A transmitter transmits data by performing IFFT. A receiver reconstructs original data by performing FFT on a received signal. The transmitter uses IFFT to combine multiplexed subcarriers. And, the receiver uses corresponding FFT to separate the multiplexed subcarriers.

The present invention is intended to provide a method of efficiently transferring location information of a resource region for transmitting PHICH in the above-described wireless communication system and a method of facilitating an initial access user equipment to receive PDCCH using the same. For this, how to specify a resource region for transmitting PHICH is explained in the first place as follows.

First of all, in the 3GPP LTE system, PHICH is transmitted via first m OFDM symbols among OFDM symbols of each subframe, where $m \geq 1$. And, PHICH and other control signals are transmitted via specific resource elements (REs) within first n OFDM symbols of the corresponding subframe, where $n \geq m$. Meanwhile, PDCCH is transmitted via REs except the former REs for carrying the above-mentioned PHICH and other control signals within the n OFDM symbols of the subframe. Hence, in order to receive scheduling information via the PDCCH of each subframe, the user equipment should know how PHICHs are mapped to the corresponding subframe.

Resource region mapping of PHICH in each subframe of each cell can be determined by two factors including information corresponding to an N value that is the number of PHICHs existing in the corresponding subframe and information corresponding to an m value that is the number of OFDM symbols having the PHICH mapped thereto in the subframe. In this case, the number of the OFDM symbols having the PHICH mapped thereto can be names a "PHICH duration". Hence, the user equipment should know the two factors to receive the PDCCH of each subframe.

Meanwhile, the PHICH group means a set in which PHICHs are multiplexed by CDMA. In particular, a plurality of PHICHs mapped to a same resource element (RE) set construct a PHICH group. In this case, the PHICHs within the PHICH group can be discriminated from each other by different orthogonal sequences, respectively. If the number of the PHICH groups is represented as $G_N$, the following relation with the number N of PHICHs is established.

$$N = G_N * C \qquad \text{[Formula 1]}$$

In Formula 1, 'C' indicates the number of orthogonal or pseudo-orthogonal codes used for multiplexing by CDMA. Since a value of C can be determined fixed according to a system environment, it is able to obtain the number N of PHICHs according to the number $G_N$ of the PHICH groups. Hence, the information corresponding to the number N of the PHICHs per subframe can be the value N itself or the value $G_N$.

In brief, a location of a resource region for transmitting PHICH can be determined by the number N of PHICHs per subframe or the per-subframe PHICH group information (hereinafter named; first information') corresponding to the number N and the OFDM symbol number value m (hereinafter named 'second information') having the PHICH per subframe mapped thereto. In case that the transmission resource region location of the PHICH is determined based on the above informations, it is able to determine a location of the transmission resource region of the PDCCH.

FIGS. 2A to 2D are exemplary diagrams to explain the concept of a resource region location for transmitting PHICH and corresponding PDCCH transmission position according to first information and second information.

Figure 2A:
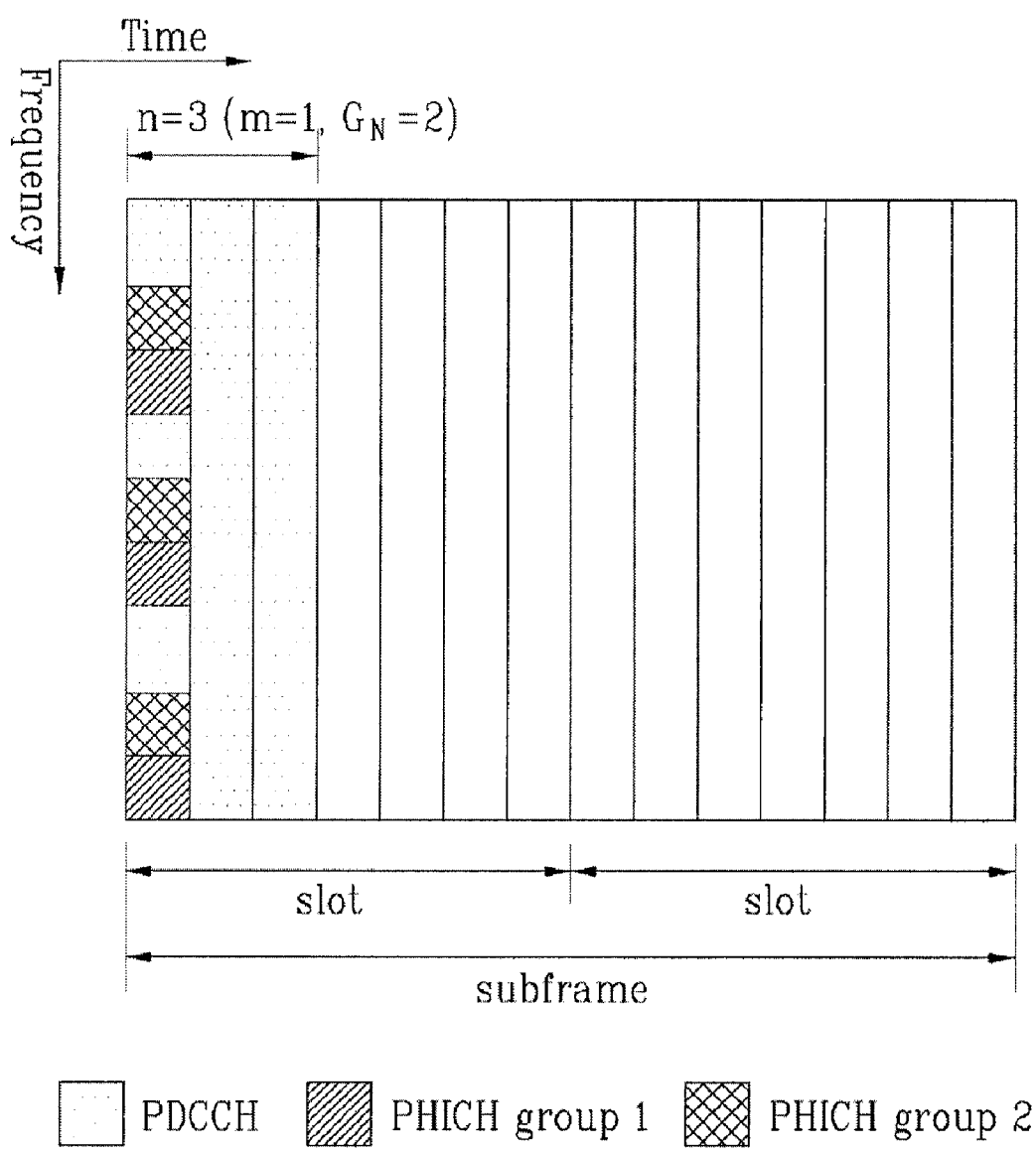
FIGS. 2A to 2D are exemplary diagrams to explain the concept of a resource region location for transmitting PHICH and corresponding PDCCH transmission position according to first information and second information.
Figure 2B:
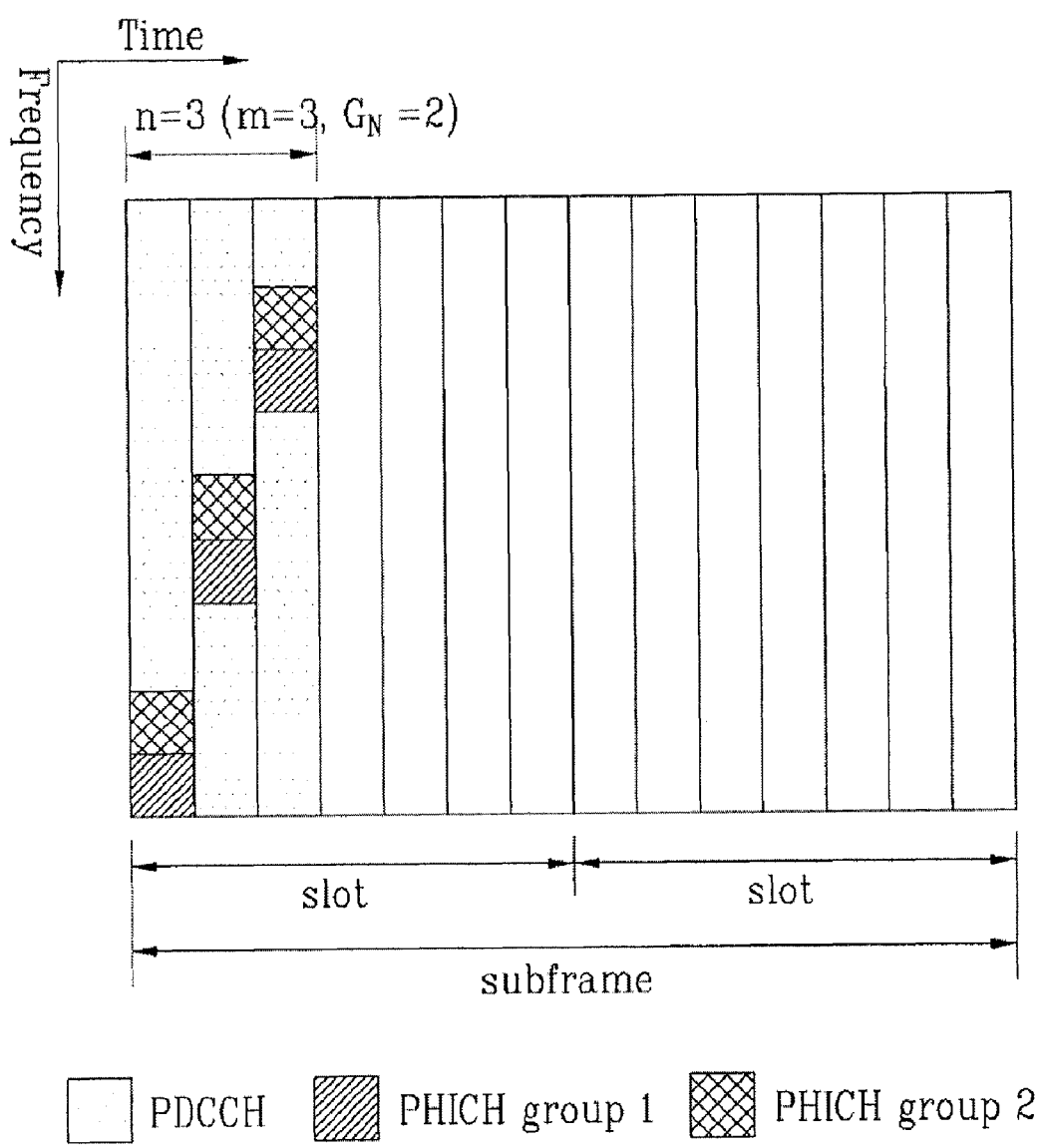
Figure 2C:
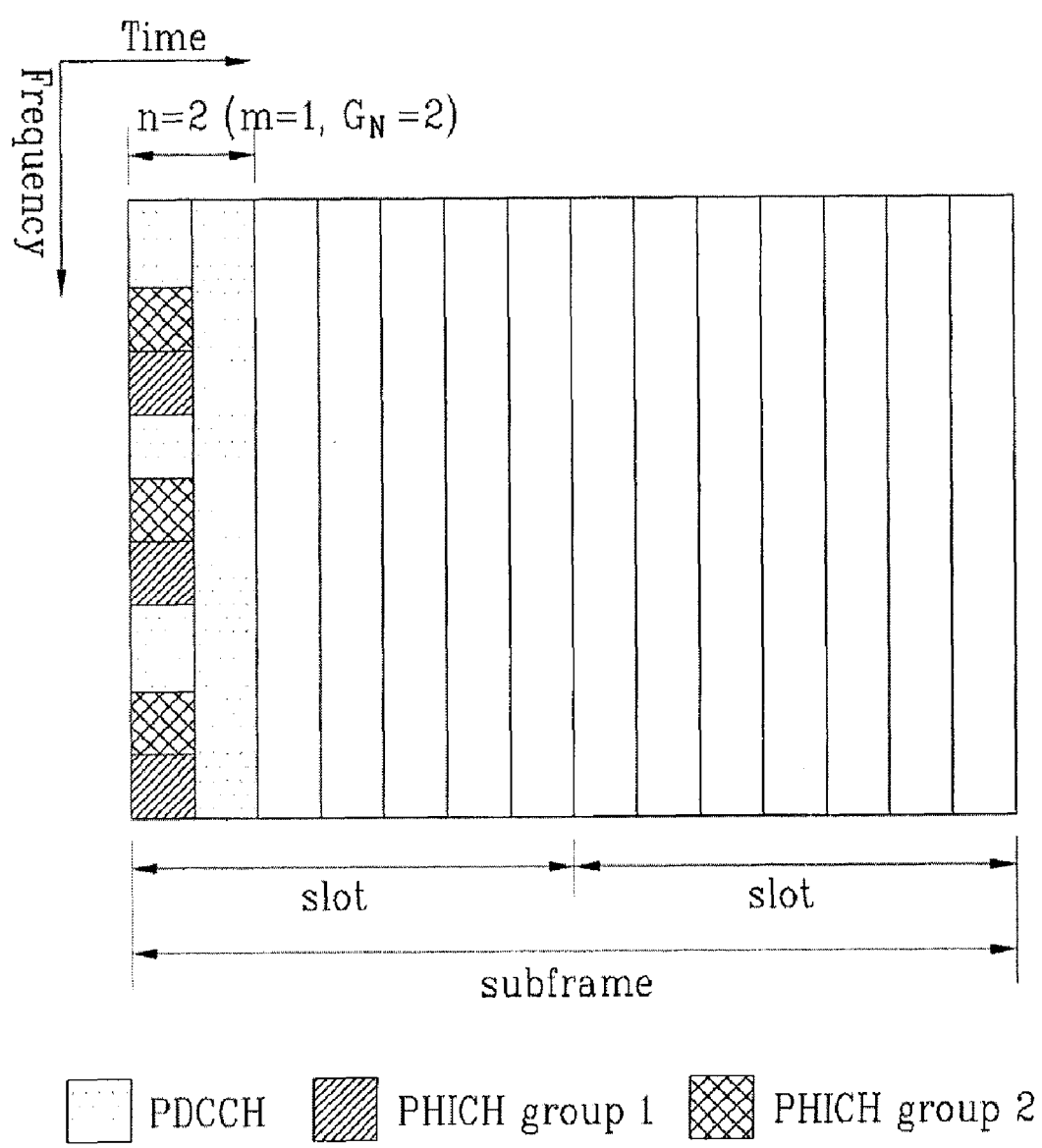
Figure 2D:
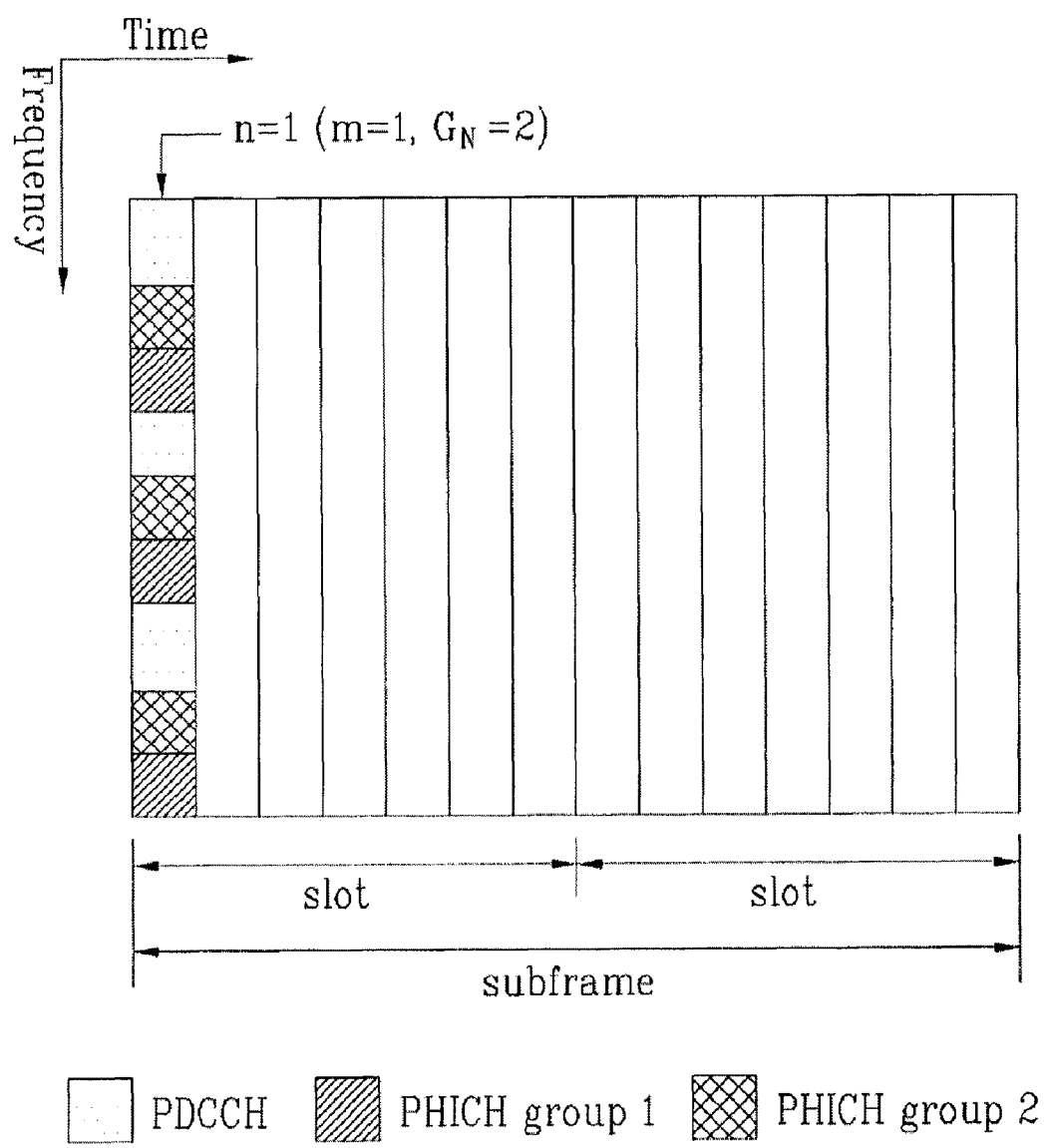

In FIG. 2A and FIG. 2B, shown are the case that a PHICH duration m is 1 or 3 in case that an OFDM symbol interval n for control information transmission within a subframe is 3 and that the number $G_N$ of PHICH groups is 2. FIG. 2C and FIG. 2D show the case of m=1 and $G_N$=2 in case that n is 2 or 1. Referring to FIGS. 2A to 2D, if the first information such as N or $G_N$ and the second information corresponding to m are specified, a resource region for transmitting PHICH can be obtained according to a predetermined pattern. Hence, it is able to obtain a position for transmitting PDCCH within an OFDM symbol region within a range of n.

In the following description of an embodiment, a method of announcing the first and second informations efficiently is explained. Prior to looking into the method of transferring the PHICH transmission region information efficiently, it is necessary to review the relation between informations required for a reception of each channel.

Figure 3:
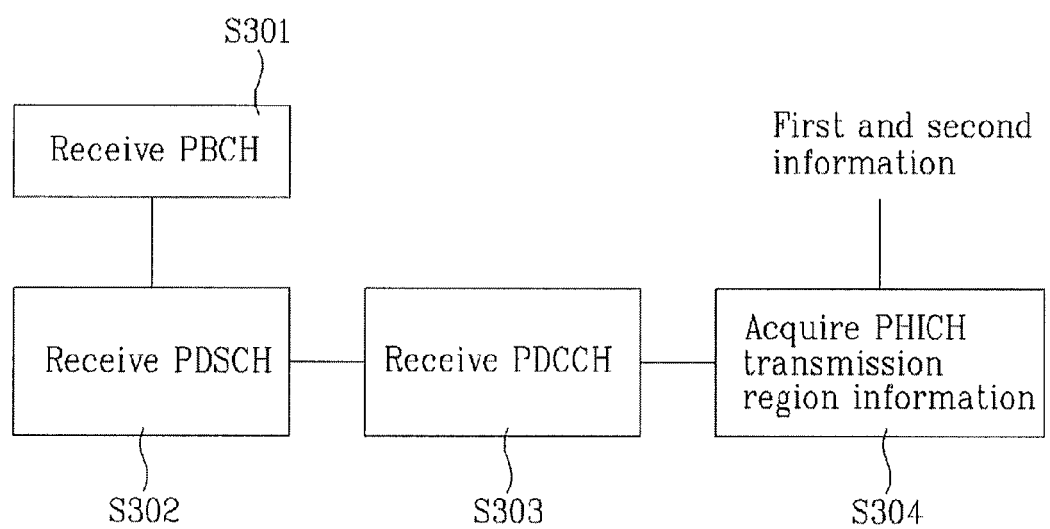
FIG. 3 is a conceptional diagram to explain information relation to enable an initial access user equipment to receive PDSCH.

FIG. 3 is a conceptional diagram to explain information relation to enable an initial access user equipment to receive PDSCH.

First of all, an initial access user equipment is able to acquire basic system information by receiving PBCH [S301].

Yet, as mentioned in the foregoing description, in order to acquire detailed system information, a reception of PDSCH is necessary [S302]. Meanwhile, since scheduling information of the PDSCH is transmitted via PDCCH of each subframe, for the PDSCH reception [S302], a reception [S303] of the PDCCH is necessary. Besides, since the PDCCH, as shown in FIG. 2, is transmitted via a region except the transmission region of the PHICH and other control information within the n-OFDM symbol range of each subframe, acquisition [S304] of information on the PHICH transmission region within the subframe is necessary.

Meanwhile, the PHICH transmission region, as mentioned in the foregoing description with reference to FIG. 2, can be determined via the first information and the second information.

It can be observed from FIG. 3 that the initial access user equipment is facilitated to acquire the first information and the second information in a manner of transmitting the first and/or second information via PBCH. Therefore, a method of transmitting first information via PBCH according to one embodiment of the present invention is proposed. In case that the first information is transmitted via PBCH, the transmitted information can correspond to the number N of PHICHs per subframe or the PHICH group number $G_N$.

Meanwhile, a method of determining first information according to a system bandwidth in advance is available as well. For instance, in case that L RBs (resource blocks) exist within a system band of a prescribed cell, PHICH information on a data transmission via each of the RBs can be transmitted in downlink. In this case, L PHICHs corresponding to the RB number within the system band can be set to a basic N in each downlink subframe. If so, it is unnecessary to transmit a value of the N to a user equipment separately. Alternatively, by defining the $G_N$ value corresponding to the number of PHICH groups instead of the N value, the same effect as defining the N value can be obtained.

In this case, the following items can be taken into consideration. For instance, in case that multi-user MIMO transmission or single-user MIMO transmission is possible in uplink, the number of necessary downlink PHICHs can be incremented into the multiplications amounting to a difference possible for spatial multiplexing in uplink. When data are transmitted in uplink via several RBs, it is unnecessary to transmit PHICH information on all RBs in downlink. Hence, the number of PHICHs may be decremented. Therefore, another embodiment of the present invention proposes a method of determining the number of basic PHICHs determined in advance according to a system bandwidth (or the basic PHICH group number) and then announcing a ratio of the number of the basic PHICHs (or the basic PHICH group number) to the number of real PHICHs (or the real PHICH group number) via PBCH, instead of transmitting the first value via PBCH in direct.

For instance, assume that the basic PHICH group number is determined in advance according to a system bandwidth and assume that a constant corresponding to a ration of the basic PHICH group number to the real PHICH group number is transferred via PBCH. Generally, a PHICH group indicates PHICHs mapped to the same resource element set by orthogonal code. In case of the 3GPP LTE system, the number of PHICHs mapped to a single PHICH group can be 8 or 4. In particular, in case of using a general CP, eight PHICHs can be mapped to a single PHICH group. In case of using an extended CP, four PHICHs can be mapped to a single PHICH group.

For instance, assuming that a downlink bandwidth indicated by a frequency domain RB unit in a subframe using a general CP is set to $N_{RB}^{DL}$, the number of PHICH groups can be represented as Formula 2 or Formula 3.

$$G_N = a\lceil N_{RB}^{DL}/8 \rceil \quad \text{[Formula 2]}$$

$$G_N = \lceil a \cdot N_{RB}^{DL}/8 \rceil \quad \text{[Formula 3]}$$

In Formula 2 and Formula 3, $\lceil x \rceil$ indicates an integer equal to or greater than x. In Formula 2 and Formula 3, 'a' is a constant corresponding to a ratio the basic PHICH group number ($\lceil N_{RB}^{DL}/8 \rceil$ or $N_{RB}^{DL}/8$) determined in advance according to a system bandwidth to the real PHICH group number GN and is assumed as transmitted via PBCH in the present embodiment. For instance, the 'a' can be one of ⅙, ½, 1 or 2. Yet, the 'a' may correspond to another value according to a system requirement. Moreover, Formula 2 and Formula 3 are exemplary for the case of using the general CP. In case of using the extended CP, two times of the basic PHICH group number can be used for the calculation of the real PHICH group number $G_N$.

Meanwhile, in order to secure a PDCH transmission position, second information corresponding to a PHCH duration m needs to be secured as well as first information corresponding to the PHICH transmission number N or the PHICH group number $G_N$.

According to one embodiment of the present invention for the second information, proposed is a method of transferring the second information via signaling information of PBCH like the first information. If a value m, as shown in FIG. 2, is set to either 1 or 3, it is able to transfer the second information to a user equipment via 1-bit signaling of PBCH. Moreover, it is able to set to indicate that the value m corresponds to either 1 or 2 via the same 1-bit signaling as well.

According to another embodiment of the present invention, proposed is a method of defining a value m to be determined in advance according to a value N per bandwidth in case that the number (value N) of PHICH allocation varies within a single bandwidth. For instance, in case that the value N is allocated different as 1 to 50 in a system having a bandwidth of 10 MHz, if a value N is equal to or greater than 1 and equal to or smaller than 25, it is able to define m=1 in advance. If the value N is equal to or greater than 26 and equal to or smaller than 50, it is able to define m=2 in advance. If so, a user equipment is able to know a value m through the value N without transmitting a value m separately.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Accordingly, a method of transferring PHICH transmission resource region information and a PDCCH receiving method using the same according to the respective embodiments of the present invention is applicable to the 3GPP LTE system. Yet, the principle for a user equipment applied to the present invention to receive each channel information and the principle for acquiring information necessary for the same are applicable to other wireless communication systems.

What is claimed is:

1. A method for a user equipment (UE) to receive a PDCCH (physical downlink control channel) transmitted from a base station via a specific resource region, the method comprising:
   receiving a PBCH (physical broadcast channel), comprising system bandwidth information and PHICH (physical hybrid ARQ indicator channel) related information, the PHICH related information comprising first information associated with a number (GN) of at least one PHICH group per subframe and second information corresponding to a PHICH duration (m) indicating a number of OFDM symbols for the at least one PHICH group per subframe, from the base station, wherein one PHICH group of the at least one PHICH group consists of a plurality of PHICHs multiplexed by using orthogonal sequences; and
   receiving the PDCCH transmitted from the base station via the specific resource region for downlink control information, the specific resource region being selected among resource regions not being used for a PHICH transmission based on the first information and the second information.

2. The method of claim 1, wherein the specific resource region is within a resource region having a prescribed number of OFDM symbols in a time axis starting from a first OFDM symbol of each subframe excluding the resource region for the PHICH transmission.

3. The method of claim 1, further comprising:
   acquiring resource region information for a PDSCH (physical downlink shared channel) transmission based on the downlink control information received through the PDCCH.

4. The method of claim 3, further comprising:
   receiving the PDSCH having additional system information based on the acquired resource region information for the PDSCH transmission.

5. The method of claim 1, wherein the PHICH is transmitted by the base station via a resource region predetermined based on the first information and the second information.

6. The method of claim 1, wherein the first information is further associated with a number (N) of the PHICH per subframe.

7. The method of claim 6, wherein at least the number (N) of the PHICH per subframe or the number ($G_N$) of the PHICH group per subframe is determined based on a value resulting from multiplying a basic number predetermined according to a system bandwidth by a specific constant corresponding to the first information.

8. The method of claim 7, wherein the specific constant comprises one selected from the group consisting of ⅙, ½, 1 and 2.

9. The method of claim 7, wherein the basic number is predetermined according to the system bandwidth as $\lceil N_{RB}^{DL}/8 \rceil$ or $N_{RB}^{DL}/8$,
   wherein $N_{RB}^{DL}$ represent a downlink bandwidth in a frequency domain resource block unit, and $\lceil x \rceil$ represent a smallest integer number equal to or greater than "x".

* * * * *